(12) United States Patent
Edwards et al.

(10) Patent No.: US 7,162,710 B1
(45) Date of Patent: Jan. 9, 2007

(54) DYNAMIC MODIFICATIONS TO A HETEROGENEOUS PROGRAM IN A DISTRIBUTED ENVIRONMENT

(75) Inventors: Andrew J. Edwards, Redmond, WA (US); Carlos P. Gomes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 521 days.

(21) Appl. No.: 10/001,279

(22) Filed: Nov. 1, 2001

(51) Int. Cl.
*G06F 9/44* (2006.01)
*G06F 9/45* (2006.01)

(52) U.S. Cl. .................. 717/111; 717/130; 717/153

(58) Field of Classification Search ........ 717/168–178, 717/135–160, 111, 153, 130; 709/203–223
See application file for complete search history.

(56) References Cited

U.S. PATENT DOCUMENTS

| | | | | |
|---|---|---|---|---|
| 5,155,847 A | * | 10/1992 | Kirouac et al. | 709/221 |
| 5,410,703 A | * | 4/1995 | Nilsson et al. | 717/168 |
| 5,450,589 A | * | 9/1995 | Maebayashi et al. | 717/170 |
| 5,664,191 A | | 9/1997 | Davidson et al. | 395/670 |
| 5,790,858 A | | 8/1998 | Vogel | 395/704 |
| 5,949,972 A | * | 9/1999 | Applegate | 714/54 |
| 5,950,012 A | * | 9/1999 | Shiell et al. | 717/169 |
| 6,260,187 B1 | * | 7/2001 | Cirne | 717/110 |
| 6,314,558 B1 | * | 11/2001 | Angel et al. | 717/118 |
| 6,351,843 B1 | * | 2/2002 | Berkley et al. | 717/128 |
| 6,381,616 B1 | | 4/2002 | Larson et al. | 707/201 |
| 6,460,178 B1 | | 10/2002 | Chan et al. | 717/147 |
| 6,463,583 B1 | * | 10/2002 | Hammond | 717/162 |
| 6,481,008 B1 | * | 11/2002 | Chaiken et al. | 717/158 |

* cited by examiner

*Primary Examiner*—Tuan Dam
*Assistant Examiner*—Chuck Kendall
(74) *Attorney, Agent, or Firm*—Merchant & Gould P.C.; Ryan T. Grace

(57) ABSTRACT

Described is a system and method for dynamically modifying an executing heterogeneous program in a heterogeneous distributed computing environment. A system reference is obtained to a target system on which the heterogeneous program is executing. The target system may be a local or a remote system. Based on the system reference, a program reference associated with the program is obtained which is used to locate a component of the program. An executable code associated with the component is modified to create a modified executable code based on a modification of an internal representation of the component. The modified code is inserted into the target system memory without requiring the target system to go offline. The code is inserted either by patching over an original memory area or injecting into a new memory location. The code may be inserted when the target program is operating in user mode or kernel mode.

20 Claims, 11 Drawing Sheets

DYNAMIC MODIFICATIONS TO A HETEROGENEOUS PROGRAM IN A DISTRIBUTED ENVIRONMENT

FIELD OF THE INVENTION

The present invention relates generally to programming tools, and more particularly to debugging tools operating in a heterogeneous environment.

BACKGROUND OF THE INVENTION

In the past, when a computer experienced a problem with one of its applications while running online, the computer was taken offline to simulate the problem. However, with the advent of the Internet, computers cannot be taken offline so readily in order to identify the problem. Typically, these computers are running numerous applications and are servicing several requests from different Internet users at any one time. Therefore, it is undesirable for these computers to be taken offline. Rather, it is desirable for these computers to remain operational (i.e., "live") at all times. Thus, these computers are commonly referred to as "live" systems.

Even if it were allowable to take these computers offline, there would still be problems with diagnosing the problem offline. For example, the problems occurring online are typically related to the loading and unique circumstances of the computer at the time the problem occurred. Thus, if the computer were taken offline, the problem would disappear. In addition, for computers operating in a heterogeneous distributed computing environment, the problem is even more difficult to diagnose offline. These computers in this distributed computing environment may have various architectures and run various operating systems. The applications on these computers may have heterogeneous components that have routines in different instruction sets (i.e., Intel x86, Intel IA-64, Visual Basic (VB) byte code, Java class files, and other Virtual Machine (VM) binary). In addition, the heterogeneous components may be operating on different computers. Thus, it is difficult to generate a test scenario that has the same distribution of applications and components and has the same loading. Therefore, offline testing of computers is not very successful in duplicating and solving problems occurring on computers operating on the Internet.

Until now, there has been no workable solution for analyzing live systems in a heterogeneous distributed computing environment.

SUMMARY OF THE INVENTION

Briefly described, the present invention provides a system and method for dynamically modifying an executing heterogeneous program in a heterogeneous distributed computing environment. In one aspect, a tool, in accordance with the invention, obtains a system reference to a target system on which the heterogeneous program is executing. The system reference may reference the same system upon which the tool is executing (i.e., a local system) or may reference a remote system. In either case, the system reference is used to obtain a program reference associated with the heterogeneous program. The program reference is used in turn to locate one of several components of the heterogeneous program that reside in memory on the target system (i.e., target system memory). The component is translated into an internal representation based on an original executable code associated with the component. The original executable code may be retrieved from the target system memory or from a storage device. After the internal representation is modified to create a modified internal representation, the original executable code is likewise modified to create a modified executable code based on the modified internal representation. This modified executable code is then inserted into the target system memory without requiring the target system to go offline. The modified executable code may represent code that operates in user mode or in kernel mode and may be a procedure, a basic block, or an instruction.

In another aspect, the invention inserts the modified executable code into the target system memory after suspending one or more threads from processing on the target system. While the threads are suspended, the modified executable code is patched into the target system memory by overwriting an original memory area in which the original executable code resided with the modified executable code. The suspended threads are then allowed to resume processing. In a further refinement, if one of the suspended threads had been executing a portion of the original executable code when it was suspended, the thread is fixed before the thread is allowed to resume processing.

In still another aspect, the insertion of the modified executable code includes creating a copy of the original executable code and locating a new memory location for the modified executable code. The new memory location is sized to hold the modified executable code. The modified executable code includes additional routines or programs that may be called. The new memory location may be contiguous or non-contiguous. The modified executable code is written into the target memory at the new memory location. Then, the execution of the heterogeneous component is redirected to execute the modified code. In a further refinement, the redirection of the execution may be performed by writing a jump instruction in a first address of the original memory area. The jump instruction then repositions the execution of the heterogeneous program to the modified code.

In yet another aspect, the insertion of the modified executable code occurs in several steps such that a thread that is executing in the system memory associated with the executable code does not obtain any erroneous instructions. The insertion includes replacing a first portion of the original executable code with an instruction. The instruction disallows the thread from executing additional instructions in a second part of the original memory area. For example, the instruction may comprise a jump to itself. The insertion then replaces the second part of the original memory area with a portion of the modified executable code. The instruction is then replaced with another portion of the modified executable code, in manner such that the original memory area now contains the modified executable code.

DETAILED DESCRIPTION OF THE PREFERRED EMBODIMENT

Briefly stated, the present invention enables the analysis, modification, and insertion of code into a heterogeneous program that is executing in a distributed computing environment. The analysis, modification, and insertion of code occur without taking any computing device offline. In accordance with the present invention, modified code may be patched over original instructions of the heterogeneous program or may be injected into another portion of memory. When the modified code is injected into another portion of memory, the execution of the heterogeneous program is redirected to this other portion of memory. The modified code may be user mode code or kernel mode code. These and other aspects of the invention will become apparent to those skilled in the art from the following detailed description.

Illustrative Operating Environment

Figure 1:
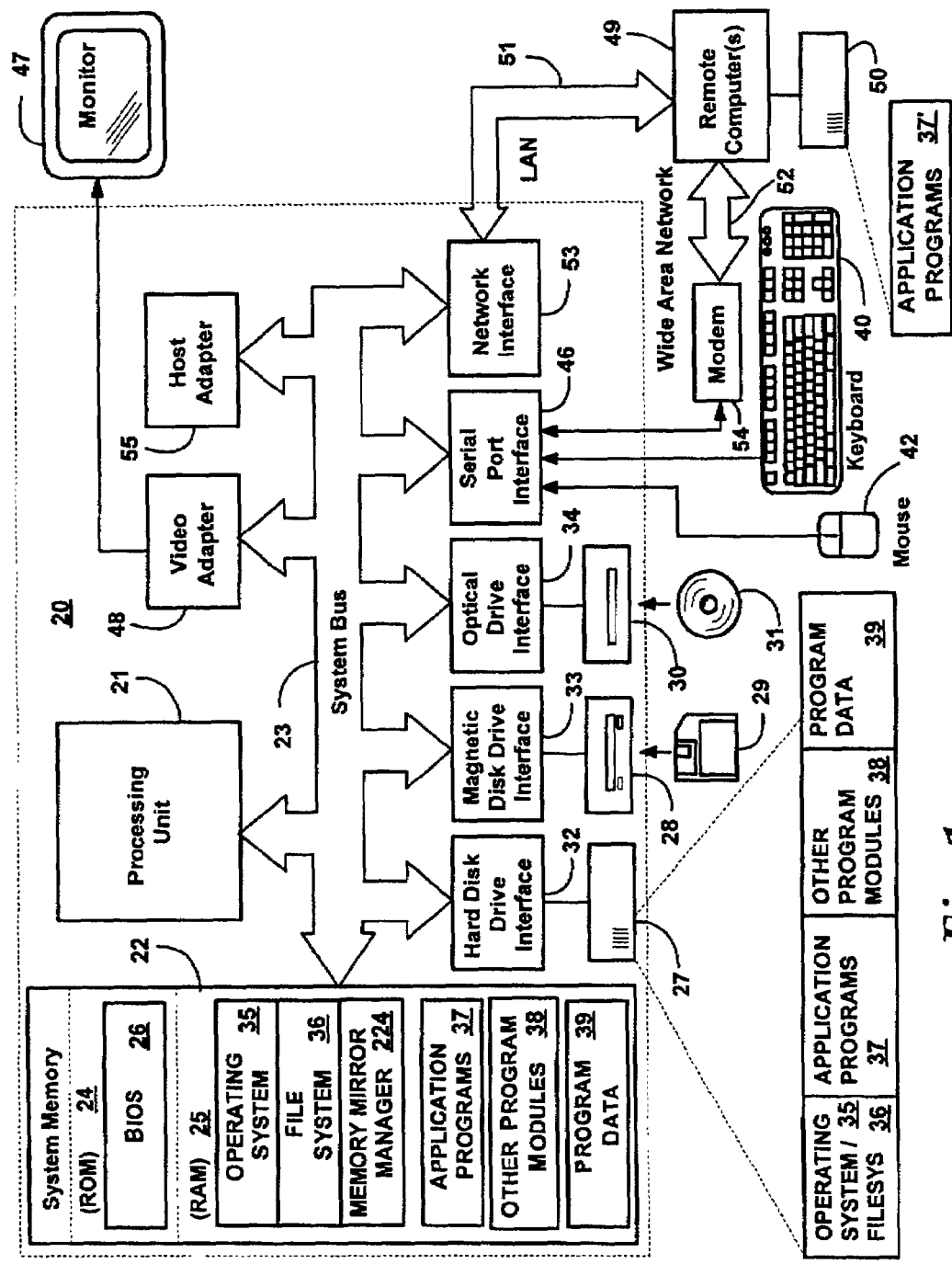
FIG. 1 illustrates an exemplary computing device for implementing one embodiment of the present invention.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. The RAM 25 may include a main physical memory subsystem and a redundant physical memory subsystem. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (such as Microsoft Corporation's Windows® 2000, operating system). The computer 20 includes a file system 36 associated with or included within the operating system 35, such as the Windows NT® File System (NTFS), one or more application programs 37, other program modules 38 and program data 39. For a dynamic instrumentation framework, as described herein, the application programs may include a dynamic instrumentation service, a dynamic instrumentation library and a remote proxy having an associated application program interface.

A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
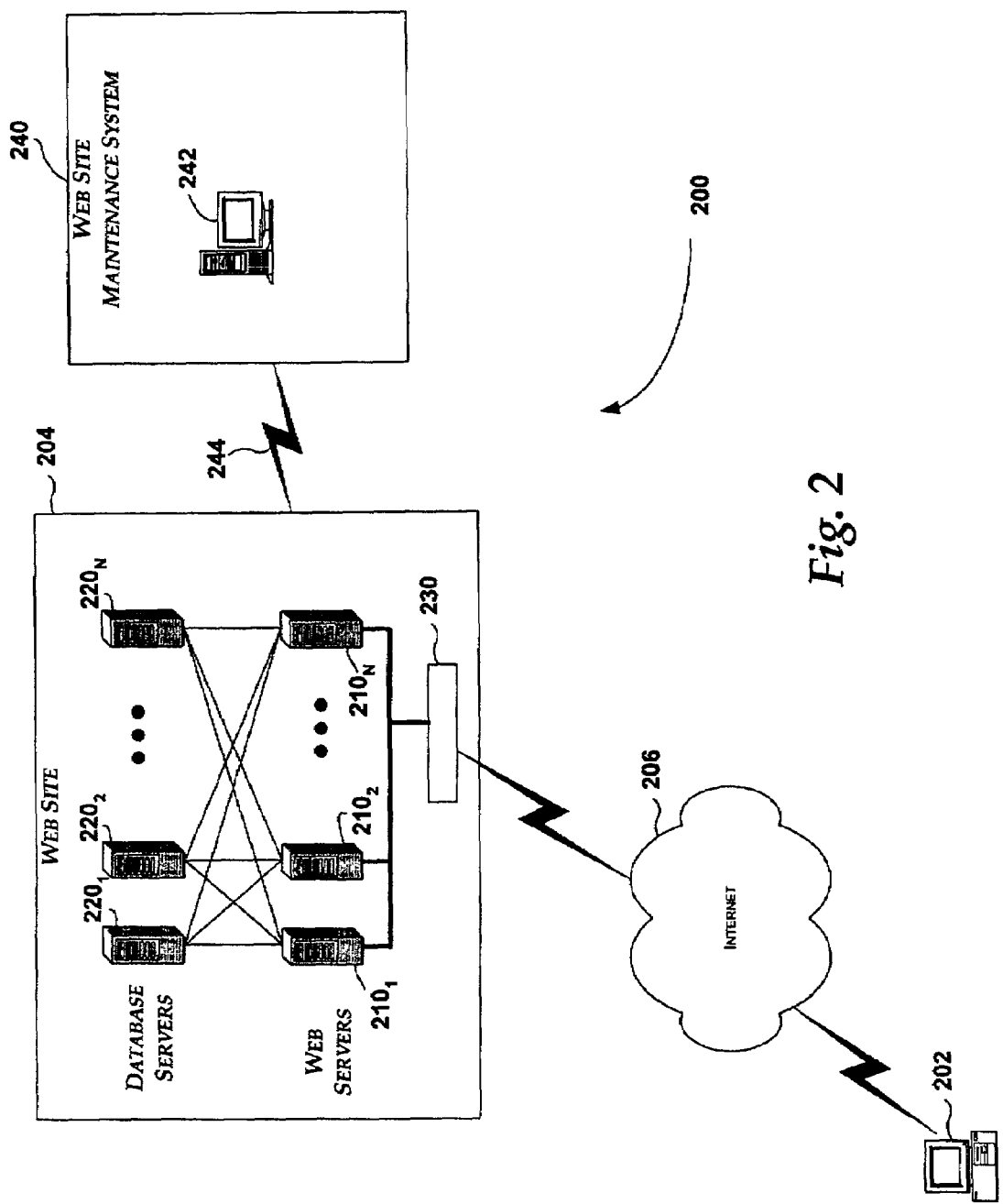
FIG. 2 illustrates an exemplary computing environment that implements one exemplary embodiment of the present invention.

FIG. 2 illustrates an exemplary computing environment 200 that implements one exemplary embodiment of the present invention. In this exemplary computing environment 200, a client computer 202 is shown accessing a web site 204 over the Internet 206. The web site 204 includes a plurality of web servers $210_{1-N}$, a plurality of database servers $220_{1-N}$, and a router 230. In this implementation, the client computer 202, the web servers 210, and the database servers 220 are each a computing device such as the one described above in conjunction with FIG. 1. Requests from the client computer 202 are input to the router 230. The router 230 then determines which web server 210 will process each request. Those skilled in the art will appreciate that web site 204 may include many other components. However, for the purposes of describing an exemplary computing environment for implementing the present invention, the general description of web site 204 is sufficient to enable those skilled in the art to practice the invention.

The exemplary computing environment 200 further includes a web site maintenance system 240. The web site maintenance system 240 includes one or more web site maintenance computers 242. The web site maintenance computer 242 is a computing device such as the one described above in conjunction with FIG. 1. An analysis tool (not shown) resides on the web site maintenance computer 242 for dynamically analyzing and modifying code running on any of the computers operating website 204, such as web servers 210 and database servers 220. The web site maintenance computer 242 communicates with website 204 over a communication link 244. As shown in FIG. 2, the web site maintenance computer 242 may be remote from the web servers 210 and the database servers 220. In another embodiment, the analysis tool may reside on each of the web servers 210 and each of the database servers 220 so that the analysis is performed locally. In either embodiment, the computing device associated with the application being analyzed remains operational.

Illustrative Dynamic Instrumentation Framework

Figure 3:
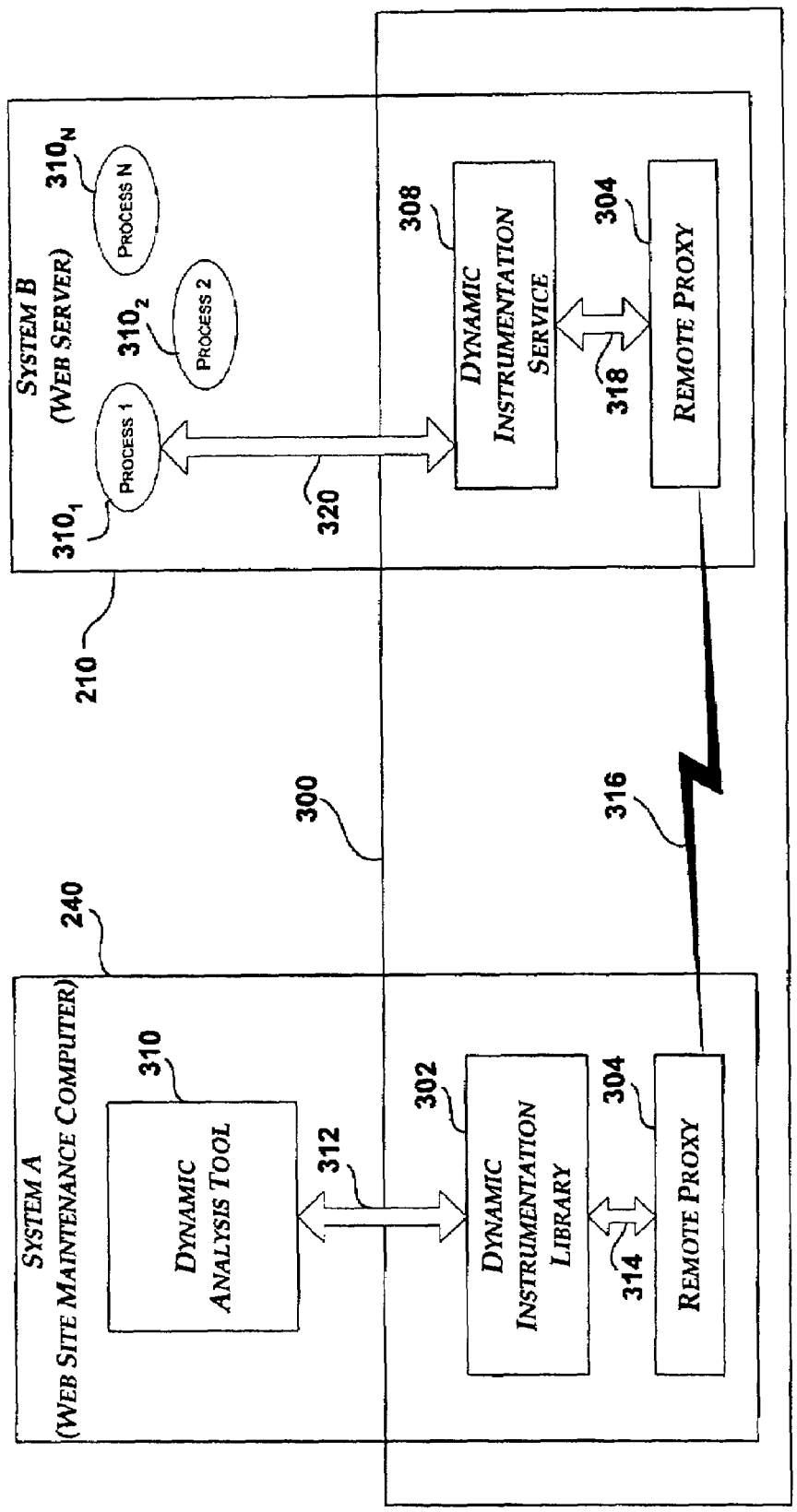
FIG. 3 is a functional block diagram of a dynamic instrumentation framework implemented within the computing environment shown in FIG. 2.
Figure 4:
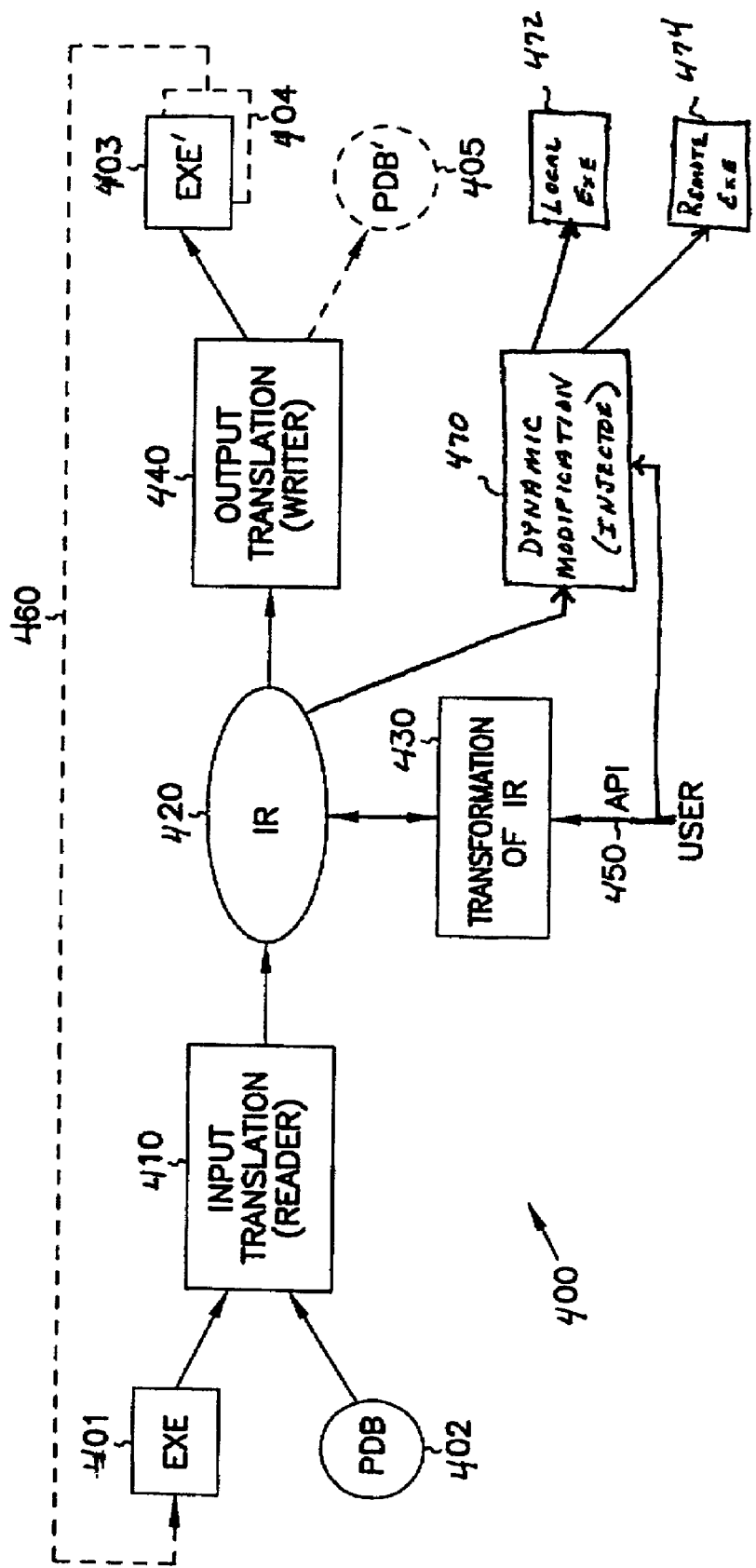
FIG. 4 is a diagram illustrating a system-level overview of the dynamic instrumentation framework shown in FIG. 3.

FIG. 3 is a functional block diagram of a dynamic instrumentation framework 300 implemented within the computing environment shown in FIG. 2. Web site maintenance computer 240 is depicted as System A and web server 210 is depicted as System B. Dynamic instrumentation framework is graphically illustrated within box 300. The dynamic instrumentation framework 300 includes a dynamic instrumentation library 302, a remote proxy 304, and a dynamic instrumentation service 308. A dynamic analysis tool 310 communicates with the dynamic instrumentation library 302 through a first set of APIs that provides navigation, query, and modification functions for an intermediate representation (IR) of a heterogeneous program or component.

In the embodiment illustrated in FIG. 3, the dynamic instrumentation library 302 communicates with the dynamic instrumentation service 308 through a remote proxy 304. The dynamic instrumentation services 308 interact with one or more processes $310_{1-N}$ through a second set of APIs. In general, the second set of APIs provides dynamic read, write, and thread management functions for modifying binary code executing in the system memory associated with processes 310. In addition, a third set of APIs enables remote instrumentation of the processes 310 over a remote communication link 316. Thus, binary code executing in processes 310 running on remote computers may be dynamically modified as if the remote process was a local process. Those skilled in the art will appreciate that the dynamic analysis tool 310 may communicate directly with the dynamic instrumentation service 308 when the processes 310 and the dynamic analysis tool 310 are running on the same computing device.

System Level Overview of the Dynamic Instrumentation Framework

FIGS. 4–7 are diagrams illustrating a system-level overview of the dynamic instrumentation framework 300 shown in FIG. 3. In general, the dynamic instrumentation framework 300 provides a mechanism for translating, transforming, and modifying components in a heterogeneous program. A heterogeneous program contains multiple executable components, such as main program code and shared libraries, written for different computer architectures (platforms) or programming languages. The system 400 comprises an input translator (reader) 410, a transformation module 430, an output translator (writer) 440 and a dynamic modifier (injector) 470. All four modules work with a high-level abstraction of a heterogeneous program, referred to as an "intermediate representation" (IR) 420. The IR is a symbolic representation that represents the functionality of the heterogeneous program.

Figure 5:
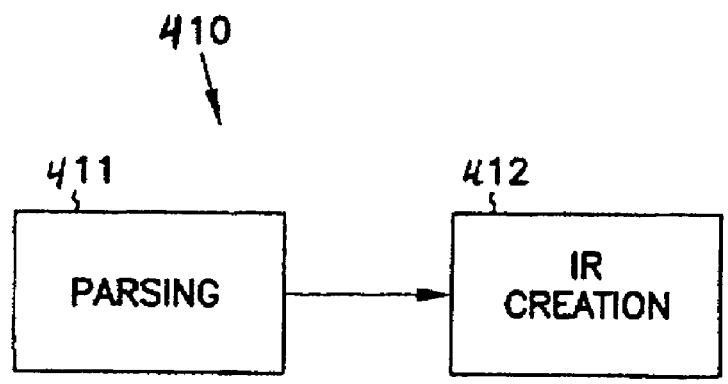
FIGS. 5–7 are diagrams illustrating additional details of the system-level overview shown in FIG. 4.
Figure 6:
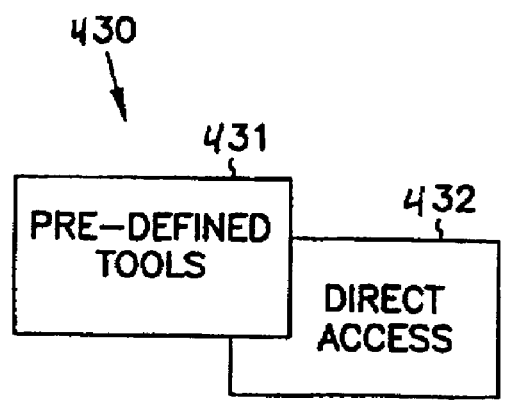

The reader 410 creates an IR 420 from an executable component (EXE) 401. In a static mode, the executable component (EXE) may be retrieved from a file stored on a storage media. In a dynamic mode, the executable component (EXE) may be retrieved from the system memory of a local or remote computing device. The reader 410 is a two-stage process as shown in FIG. 5. First, the executable 401 is parsed 411 into its basic blocks of code and data using information provided in a program database file (PDB) 402. As is well known in the art, a basic code block is defined as a code block having a single entry point and a single exit point. In an alternate embodiment, all the work performed by the parser 411 is input directly into the second stage of the reader 410, thus skipping the parsing process.

Once the code and data blocks are identified, an IR creation process 412 evaluates each platform-dependent instruction on a block-by-block basis. There are very large set of common instructions regardless of architecture, i.e., move, store, add, etc., that can be represented by a single platform-neutral IR instruction. For RISC (reduced instruction set computer) architectures, most, if not all, instructions can be easily translated into a single platform-neutral IR instruction. On the other hand, CISC (complex instruction set computer) architectures, such as the Intel x86 family, contain complex instructions that provide the function of multiple instructions. In one exemplary embodiment, the platform-dependent instructions that have a single platform-neutral IR instruction counterpart are translated into that platform-neutral instruction, while complex instructions are replicated as-is within the IR through an extended version of the basic IR instruction. A replicated complex instruction is marked with a signature that denotes its architecture. The output translator 440 recognizes a single complex instruction and processes it. In an alternate embodiment, a complex instruction is represented by a set of platform-neutral IR instructions that perform the equivalent function.

Figure 8:
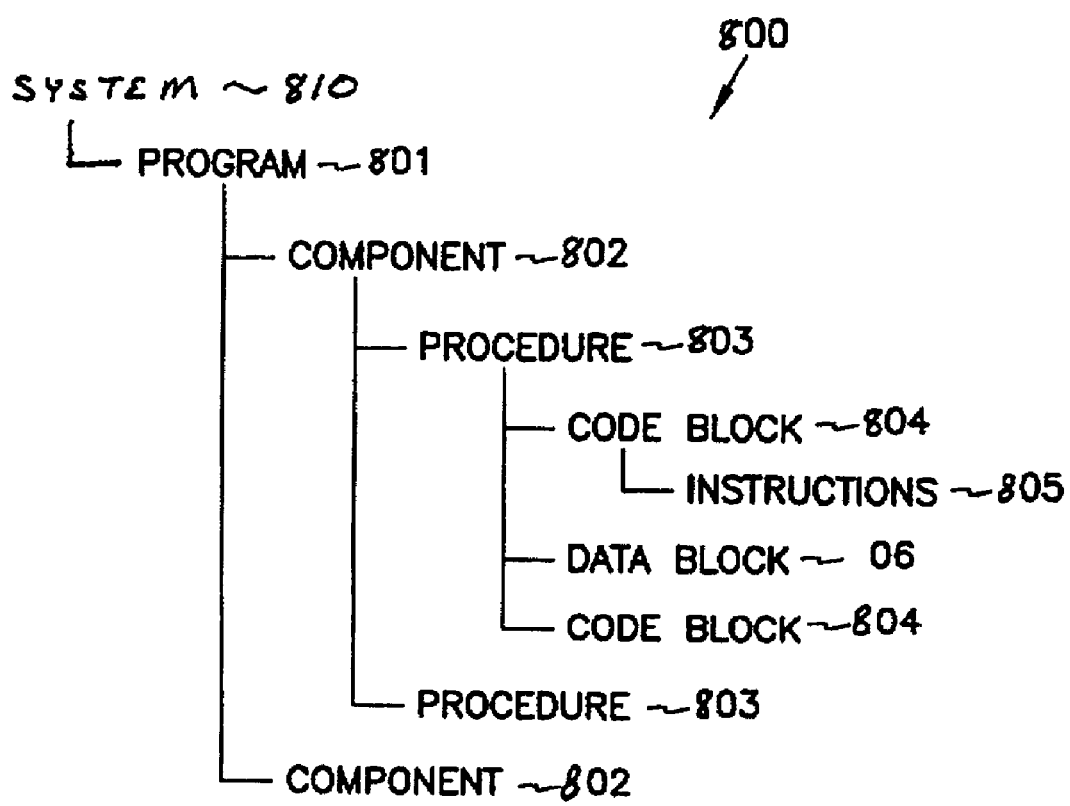
FIG. 8 is a diagram of an intermediate representation hierarchy used in the dynamic instrumentation framework of the present invention.

After the instructions in the code blocks have been translated, the IR creation process 412 creates a logical hierarchical view of the executable 401 as illustrated in FIG. 8. All architectures share the basic concepts of instructions 805, code blocks 804, data blocks 806, components 802, and procedures 803, so the IR hierarchy 800 enables the user to understand the structure of the intermediate representation of a heterogeneous program 801. In the dynamic instrumentation framework 300 of the present invention, the IR hierarchy 800 further includes a system level 810. The system level 810 allows the reader 410 and the injector 470 to perform dynamic analysis and modification of the executable 401 on any available computing device. The code blocks are logically connected as specified in the EXE file 401 so that the blocks can be more easily manipulated during the transformation process 430. Procedures are determined by following the logical connections using information provided in the PDB file 402. Procedures are collected together to create the program components. Little or no optimization of the program is performed by the creation process 412 since it is desirable that the intermediate representation be as close to what the programmer originally wrote as possible.

However, tracing the logical connections to determine the procedures can result in more procedures being created than originally coded by the programmer. Therefore, the creation process 412 annotates, or "decorates," the hierarchy 800 with the user names supplied in the symbol table for the EXE 401. The annotations enable the user to understand how the IR control flows and how the elements of the IR hierarchy correspond to the procedures and the components in the original code so the appropriate transformations can be applied to the IR. The annotations are maintained in data structures for the procedures during the transformation process and output by the output translator 440.

At the end of the creation of the IR hierarchy, all instructions are represented in the hierarchy as IR instructions within code blocks so that there is no differentiation between code written for one platform and code written for a second platform.

Once the intermediate representation is complete, the user is allowed to manipulate the code and data (illustrated by the IR transformation module 430) and to dynamically modify or inject code and data (illustrated by the dynamic modification module 470) through an application program interface (API) 450. The exemplary embodiment of the system 400 provides some pre-defined tools 431 (FIG. 6) used to instrument and optimize the IR that are guaranteed to be safe in that the tools will evaluate a change requested by the user and only manipulate the code in an appropriate manner. The API 450 also permits the user direct access 432 to the IR to navigate through the IR and to make changes, such as moving blocks between procedures, modifying blocks, rearranging the logical connections between blocks, and changing the platform-specific instruction set for a code block.

By instrumenting the IR using the tools 431, the user can now modify one or more of the various components of a heterogeneous program and write the modification into memory for execution. This process is described in detail below.

Figure 7:
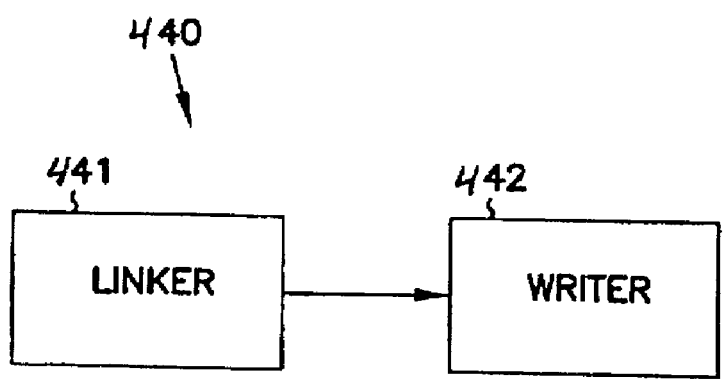

The transformed IR may now be input into the output translator 440. The output translator 440 operates on the IR in two phases as shown in FIG. 7: a linker phase 441 that resolves the logical connections into absolute addresses in an address space for a modified version of the executable, and a writer phase 442 that assembles the IR into the modified version of the executable (EXE') 403. The blocks in the executable 403 can be emitted by the writer 442 for their original platform, or can be emitted for a different platform.

When the linker 441 is used, the linker 441 must maintain the semantics of the code of the hierarchy when resolving the addresses, i.e., preserve the logical connections between blocks and the location of referenced data. The linker 441 determines the size of each code block based on the length of each instruction in the block. The linker 441 is also responsible for adding whenever prologue and epilogue code necessary to "glue" together contiguous blocks that will be assembled into different platform-dependent instructions. As part of the address resolution, the linker 441 also can perform limited code modification or optimization. For example, assume that prior to the transformation process 430, there was a jump between two code blocks, but those blocks are now contiguous. In this case, the linker 441 removes the now-unnecessary jump and lets the logic flow fall through to the second block. Because the hierarchy extends down to the instruction level and is consistent regardless of the manipulation performed by the user, the linker 441 has more knowledge of the placement of instructions than did the programmer. Thus, in architectures in which instructions have both a long and short form depending on the location they are addressing, the linker 441 chooses the appropriate instruction size, which can be a better choice than that originally made by the programmer.

The writer 442 assembles each IR instruction into its platform-dependent counterpart based on the architecture specified in the code block. In an exemplary embodiment in which complex instructions are replaced in the IR, if the complex instruction is being written to the same platform, the writer 442 merely emits the instruction. If the complex instruction is designated to be translated into a different architecture, the writer 442 creates the appropriate set of platform-specific instructions to perform the same function as the original, complex instruction.

As part of the EXE' 403, the writer 442 creates an emitted block information data structure containing the annotations created by the reader process 410 for each block in the executable. This allows the EXE' 403 to be iterated through the entire process 400 as many times as desired (represented by phantom arrow 460), while enabling the user to distinguish the original procedures from those added in a previous iteration. In an alternate embodiment, the emitted block information is combined with the PDB file 402 to create a new version of the program database file (PDB') 405 (shown in phantom).

In an alternate exemplary embodiment of the translation and transformation system 400 not illustrated, the IR containing the absolute addresses assigned by the linker 441 is used as input into the IR creation process 412 for further iteration through the system 400. One of skill in the art will immediately appreciate that much of the work performed by the creation process 412 as described above can be skipped when iterating the modified IR through the system 400. This embodiment allows the user to transform a heterogeneous program in stages rather than having to make all the changes in a single pass through the system 400.

In an exemplary embodiment of the present invention, the transformed IR may be input into the dynamic modifier 470. The dynamic modifier 470 determines whether the transformed IR needs to be "patched" or "injected". Patching occurs when the transformed IR is the same size as the original IR. In this case, the modified instructions corresponding to the transformed IR can be written over the original instructions in the system memory. Injecting occurs when the transformed IR is a different size than the original IR. In this case, a copy of the original instructions is created, the modified instructions corresponding to the transformed IR are committed into system memory, and then the execution is redirected to the modified instructions. The execution may be redirected by inserting a jump instruction in the memory location corresponding to the first original instruction. The jump then redirects the flow to the modified instructions. In both patching and injecting, the dynamic modifier 470 may suspend threads from processing on the system, write changes into the system memory, and resume the threads for processing. The dynamic modification process 470 is described in detail below.

The system level overview of the operation of an exemplary embodiment of the invention has been described in this section of the detailed description. A translation, transformation, and modification system translates a binary component into an intermediate representation, provides an application program interface through which a user can transform the intermediate representation, translate the intermediate representation as transformed by the user into a modified version of the binary, or redirect the execution of a component to a modified version of the binary. While the invention is not limited to any particular arrangement of modules, for sake of clarity exemplary set of modules has been described. One of skill in the art will readily recognize that the functions attributed to the modules described in this section can be assigned to different modules without exceeding the scope of the invention. Furthermore, although the translation and transformation of only one input component (EXE 401) has been illustrated and described above, the system can take multiple components, and accompanying PDB files, as input. Likewise, the system can dynamically modify multiple components running on various systems.

Figure 9:
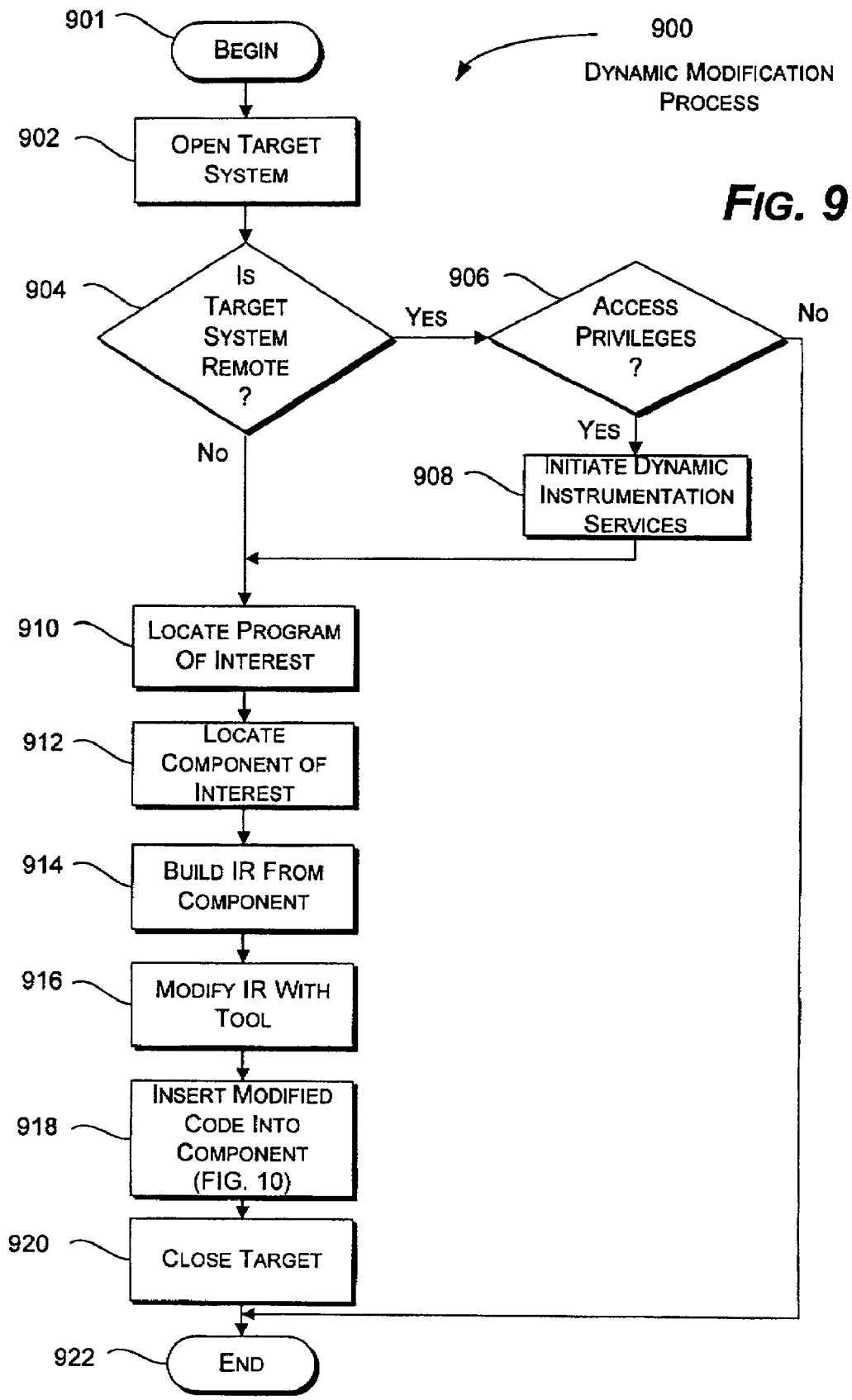
FIG. 9 is a logical flow diagram illustrating an exemplary overview of a dynamic modification process.

Exemplary Embodiment of a Dynamic Modification Process for a Heterogeneous Program FIG. 9 is a logical flow diagram illustrating an exemplary overview of a dynamic modification process in accordance with the present invention. The process 900 begins at block 901, where a user-defined tool is executing and wishes to perform dynamic modifications to some heterogeneous program executing on a computer system within the distributed computing environment. The process continues at block 902.

At block 902, the target system is "opened". When opening the target system, the tool obtains a reference to the target system that may be used to obtain information about the target system and to add new processes to the target system. Once the target system is open, processing continues at decision block 904.

At decision block 904, a determination is made whether the computer system (i.e., the target system) executing the heterogeneous program of interest (i.e., the target program) is on the same system as the caller (i.e., the local system) or whether the target system is different than the caller (i.e., a remote system). If the target system is a remote system, processing continues at decision block 906.

At decision block 906, a determination is made whether the user-defined tool has sufficient access privileges to the target program. If the tool does not have sufficient access privileges, it will be unable to dynamically modify the target program, so processing proceeds to end block 922. If, however, the tool does have sufficient access privileges, processing continues at block 908.

At block 908, the dynamic instrumentation service is initiated. Using the system reference obtained when opening the target system, the tool adds the dynamic instrumentation services to the processes executing on the target system. The dynamic instrumentation service allows the tool to communicate with the remote target system as if the target program was residing on the local system. Thus, hereinafter, a remote target system and a local target system will both be referred to as "the target system" because the dynamic instrumentation services handles cross-machine, as well as cross-platform, communication. In one embodiment, the dynamic instrumentation service is implemented with a distributed common object model (DCOM) interface. Processing continues at block 910, as does the processing if the determination at decision block 904 concludes that the target system is local.

At block 910, the target program is "opened". By opening the target program, the tool obtains a reference to the target program that may be used to obtain additional information about the target program, such as its components. The tool may open a target program that represents a kernel mode program. Once the target system is open, processing continues at block 910.

At block 912, a component of interest is located. As mentioned above, each program may include many components. Each component may be coded in one of several different instruction sets. Thus, the tool may use the program reference obtained when opening the target program, to iterate through the components until the component of interest is located. If the target program represents the kernel mode program, the component may be kernel code. Otherwise, a component may be user mode. Processing continues at block 914.

At block 914, an internal representation of the component of interest is built. The internal representation (IR) may be built from the executable component residing in the target system memory or from the executable component residing on a storage device. When the target program is local, the IR is typically built using the executable component residing in the target system memory. In contrast, when the target program is remote, the IR is typically built using the executable component residing on a storage device. By building the IR using the component on the storage device, the tool circumvents the delay that would result from reading and sending the memory contents over a network. However, because the IR was not built from the executable component in target system memory, the location (i.e., address) of the executable in the target system memory is not known. Thus, later, when the executable component is modified, the location of the executable component in the target system memory is determined. As one skilled in the art will appreciate, building the executable component from the storage device may occur if the target system is local or remote without departing from the present invention. Likewise, building the executable from the target system memory may occur in either situation without departing from the present invention. Once the IR is built, processing continues at block 916.

At block 916, modifications to the IR may occur. Modifications to the IR are made in a manner similar to modifications performed on the IR when the tool is operating in a static mode. Typically, in the static mode, all the modifications are completed before the modified components are written to the storage device. However, in the dynamic mode in accordance with the present invention, modifications to the component may be performed incrementally whenever a modification is requested for insertion. Processing continues as block 918.

Figure 10:
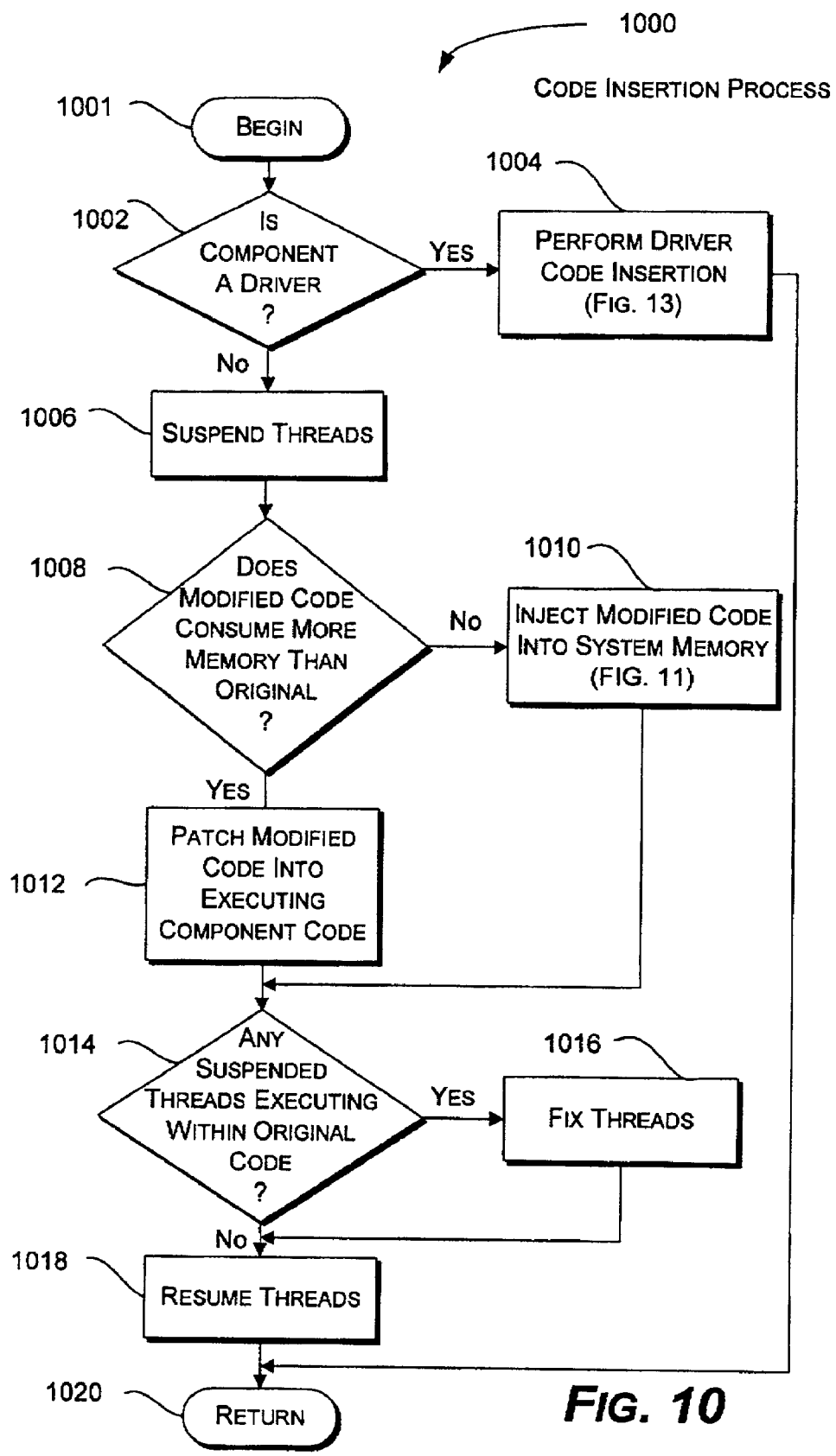
FIG. 10 is a logical flow diagram illustrating a code insertion process suitable for use in the dynamic modification process shown in FIG. 9.

At block 918, modifications to the executable code are inserted into the target system memory. In general, the modified code is inserted without causing the target system to experience errors with the modified code or with any other code residing in the target system memory. The manner in which modified code is inserted depends on whether the modified code is user mode code (e.g., applications) or kernel mode code (e.g., drivers). Hereinafter, kernel mode code will be referred generally as driver code. The process for inserting modified code is illustrated in FIG. 10 and described below. The inserted modified code may be at a procedure, a basic block, or an instruction granularity. Processing continues at block 920.

At block 920, the target system and target program are closed. This terminates the processes that were opened for dynamic modifications and frees up resources that were allocated. Processing then continues to end block 922.

FIG. 10 is a logical flow diagram illustrating a code insertion process suitable for use in the dynamic modification process shown in FIG. 9. The process 1000 begins at block 1001, where modified code is ready to be inserted into the target system memory. The process continues at decision block 1002.

At decision block 1002, a determination is made whether the modified code is driver code. As mentioned above, the manner in which code is inserted depends on the whether the inserted code will operate in user mode or kernel mode. If the modified code is driver code, processing continues at block 1004.

Figure 13:
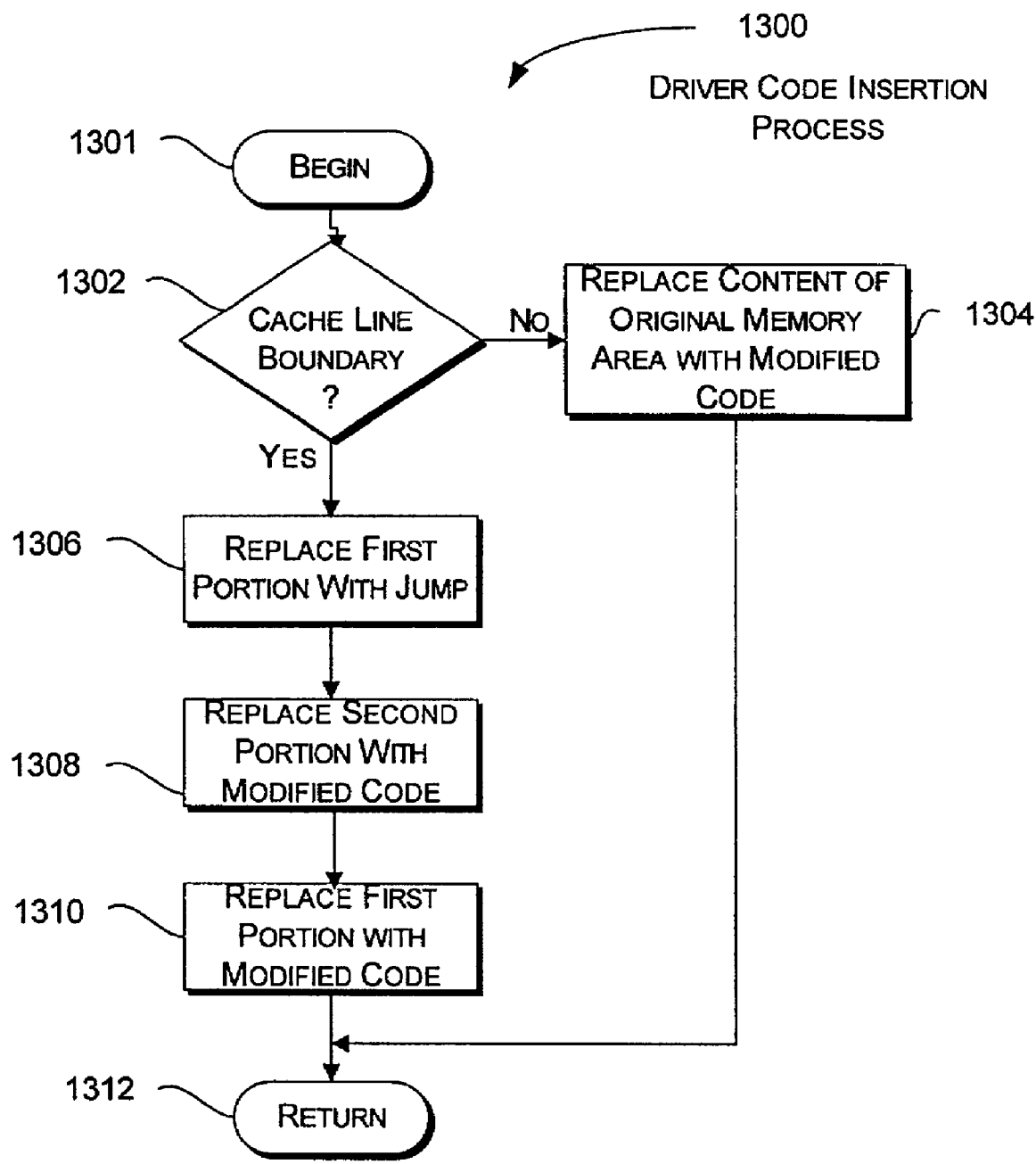
FIG. 13 is a logical flow diagram illustrating a driver code insertion process suitable for use in the code insertion process shown in FIG. 10.

At block 1004, driver code insertion is performed. Briefly, for driver code, the inserted code will operate in kernel mode. Kernel mode does not allow suspending and resuming threads. FIG. 13 illustrates the insertion process for driver code and will be discussed below. Once the modified code has been inserted into the driver code, the insertion process is finished and processing continues to return block 1016.

Returning to decision block 1002, if the modified code is user mode code, processing continues at block 1006. At block 1006, threads that are currently executing are suspended. Processing continues at decision block 1008.

At block 1008, a determination is made whether the modified code consumes more memory than the original code that it replaces. If the modified code is larger than the original code, processing continues at block 1010.

Figure 11:
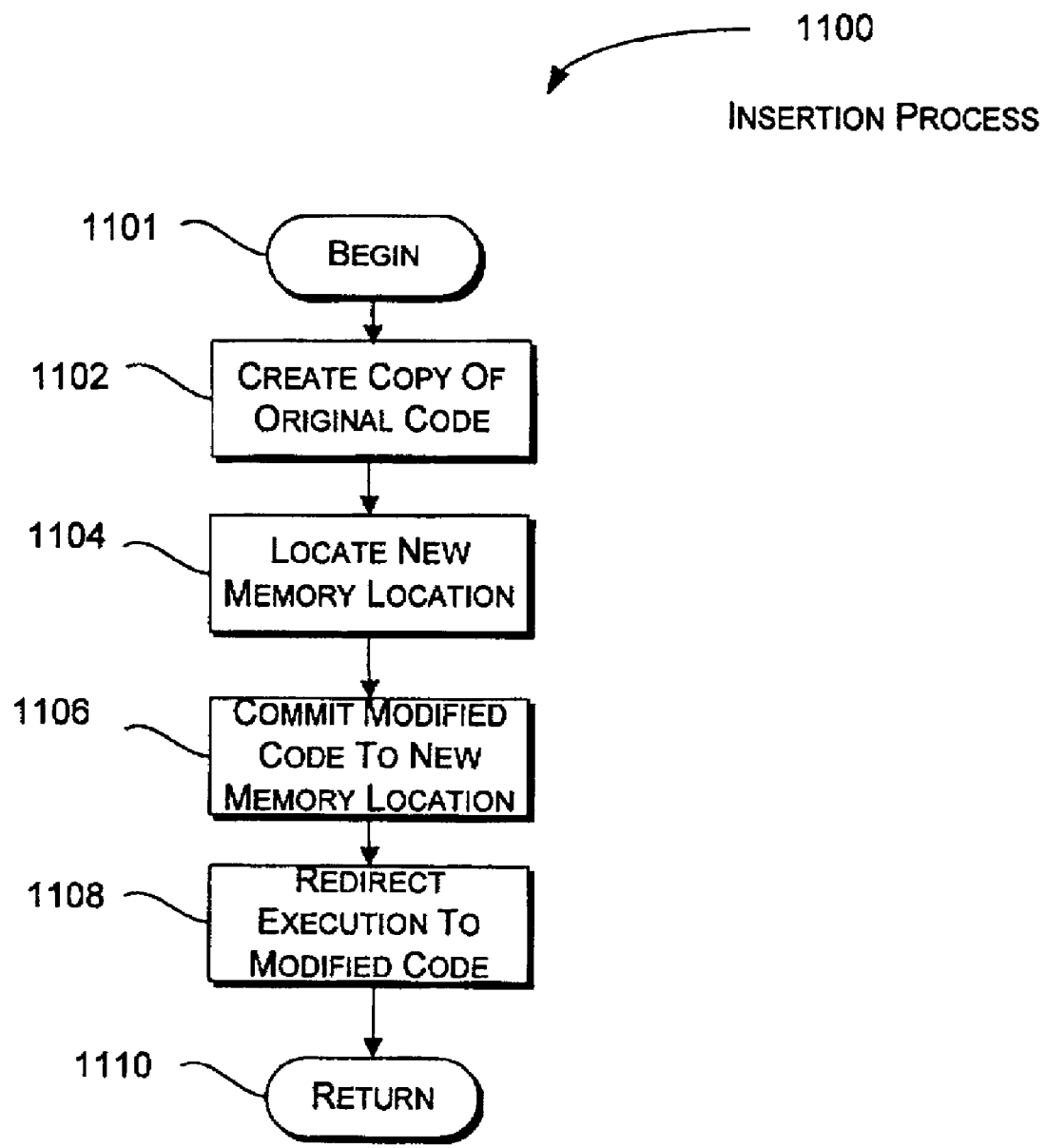
FIG. 11 is a logical flow diagram illustrating an injection process suitable for use in the code insertion process shown in FIG. 10 when the modified code consumes more memory than the original code.

At block 1010, the modified code is injected into the system memory. Briefly, because the modified code is larger than the original code, a new location in the target system memory must be found. Then, execution of the heterogeneous program is redirected to this new location. Injecting the modified code into the system memory is illustrated in FIG. 11 and described below. Processing continues at block 1014.

Returning to decision block 1008, if the modified code is the same size as the original code, processing continues at block 1012. At block 1012, the modified code is patched over the original code. In other words, the modified code is written over the same memory locations that had stored the original code. Processing continues at decision block 1014.

At decision block 1014, a determination is made whether any of the suspended threads in block 1006 were in the process of executing a portion of the original code. If there was no such thread, processing continues at block 1018. Otherwise, processing continues at block 1016.

At block 1016, the thread that was executing a portion of the original code is fixed. In one embodiment, the thread is fixed by moving an instruction pointer associated with the thread. The instruction is moved from pointing to the original code to pointing to a copy of the code. The creation of the copy is described below with reference to FIG. 11. Processing continues at block 1018.

At block 1018, the threads that were suspended in block 1006 are resumed. Processing then continues to return block 1016.

Figure 12:
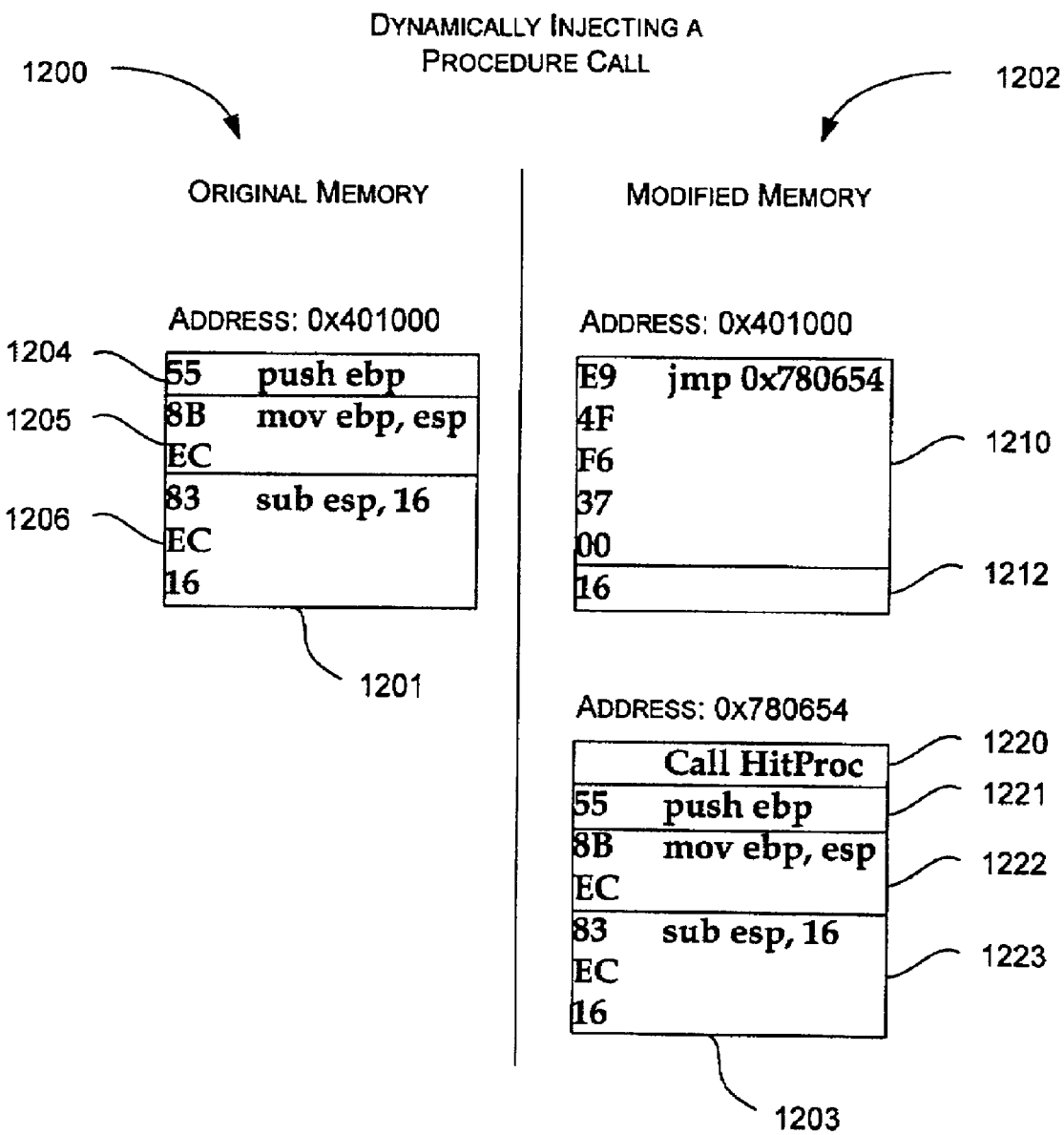
FIG. 12 is a graphical representation of memory that illustrates exemplary memory modifications that occur during the injection process shown in FIG. 11.

FIG. 11, in conjunction with FIG. 12, illustrate an injection process suitable for use in the code insertion process shown in FIG. 10. The process 1100 begins at block 1101, after it has been determined that the modified code consumes more memory than the original code. In this situation, if the modified code were written over the original code, some of the modified instructions could overwrite instructions that may be unrelated to the target component. This would cause severe execution problems. For example, as illustrated in FIG. 12, an original code 1201 residing in an original system memory 1200 includes three instructions 1204–1206 that consume six bytes starting at address 0×401000. However, a modified code 1203 includes four instructions 1220–1223 that consumes seven bytes. Thus, the modified code 1202 consumes more memory and the modified code must be injected into the system memory as described below in accordance with the present invention. Processing continues at block 1102.

At block 1102, a copy of the original code is created. This copy is stored on the local system in a manner that the user-defined tool may access if the tool encounters any problems when injecting the modified code. The copy serves as a back-up copy of the original code and may be used in an undo process. Processing continues at block 1104.

At block 1104, a new memory location within in the target system memory is located. The new memory location has sufficient address to store the modified code and to store any new procedures that are called from the modified code. Processing continues at block 1106.

At block 1106, the modified code is committed to target system memory. The modified code is written into the new memory location. At this point, the modified code exists in the target system memory but no execution of the code can take place. In essence, it is just "dead" code. Continuing the above example, the modified code 1203 shown in FIG. 12 is written into memory location 0×780654. Processing continues at block 1108.

At block 1108, execution is redirected to the modified code. In one embodiment, as shown in FIG. 12, the execution is redirected by inserting a jump instruction 1210 (e.g., opcode E9) at the beginning address location of the original code (i.e., 0×401000). The remaining bytes (e.g., 4F F6 37 00) specify the relative offset from the end of the jump instruction to the modified code. For example, continuing with the example illustrated in FIG. 12, the relative offset is 0×0037F64F, which is added to the start address of 0x401005 resulting in a jump to address of 0x780654. The jump instruction 1210 redirects the execution to a procedure called "HitProc". Thus, in the above illustration, the modified code inserted a procedure before the original instructions. This type of modification may be used to determine the number of times a portion of code is executed and the like. Processing continues at return block 1110.

While FIG. 12 illustrates a procedure call before the original code, other instructions may be inserted before the original code as along as the modified code returns execution to the first instruction 1221. As those skilled in the art will appreciate, any number of calls and additional instructions may be inserted in the modified code as long as the first address of the original code directs execution to the modified code and the modified code fits somewhere within the target system memory.

FIG. 13 is a logical flow diagram illustrating a driver code insertion process suitable for use in the code insertion process shown in FIG. 10. The process 1300 begins at block 1301, after it has been determined that the component is a driver. As mentioned above, driver threads may not be suspended like user mode threads described in FIG. 10. In addition, if there is a cache line boundary within the instruction, a processor may read the original instruction on one cycle and then read a modified instruction on the next cycle. Thus, the jump to address may have part of the old and part of the new address. This will result in a wrong jump to address and cause errors. Thus, the following driver code insertion process deals with this type of situation. Processing continues at decision block 1302.

At decision block 1302, a determination is made whether the modified code crosses a cache line boundary. If a cache line boundary is crossed, processing continues at block 1306.

At block 1306, a first portion of the original code beginning at the start address is replaced with a branch instruction. The branch instruction branches to itself. Thus, if a thread enters this code, the code will loop around through the branch instruction until the branch instruction is changed. Processing continues at block 1308.

At block 1308, a second portion of the original code is replaced with a second portion of the modified code. Processing continues at block 1310.

At block 1310, the first portion of the original code is replaced with a first portion of the modified code. Thus, once the thread enters this code now, the code will be completely modified such that no erroneous data can be obtained. Processing continues at return block 1312.

Referring back to decision block 1302, if the modified code does not cross a cache line boundary, processing continues at 1304. At block 1304, the entire modified code may replace the content of the original memory area associated with the original code of the process. Because the processor reads cache lines atomically, replacing the entire modified code will not cause errors. Processing then continues to return block 1312.

The dynamic modification process described above allows a tool, such as a debug tool, to take over the portion of code causing a problem and allows static and profile data to be generated for determining a fix for the problem. While the above example is based on a debugging tool for an internet web site, those skilled in the art will recognize that the teachings of the present application may be applied to many other environments.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for dynamically modifying an executing heterogeneous program in a distributed computing environment, the method comprising:
   obtaining a system reference to a target system on which the heterogeneous program is executing;
   obtaining a program reference to the heterogeneous program based on the system reference;
   locating a component of the heterogeneous program based on the program reference, the component residing in a target system memory associated with the target system;
   obtaining a platform neutral hierarchical intermediate representation of the component, wherein the intermediate representation represents the functionality of the component;
   modifying the platform neutral hierarchical intermediate representation of the heterogeneous program executing in the target system memory; and
   modifying an executable code in the target system memory based on the modified intermediate representation without taking the target system offline, the executable code being platform dependent and associated with the heterogeneous program.

2. The computer-implemented method of claim 1, wherein the modified executable code comprises a user mode code that executes in user mode.

3. The computer-implemented method of claim 2, wherein inserting the modified executable code comprises:
   suspending one or more threads from processing on the target system;
   if the modified executable code consumes more memory than the original executable code, injecting the modified executable code into the target system memory at a new memory location;
   else, patching the modified executable code into the target system memory by overwriting an original memory area with the modified executable code, the original executable code being resident in the original memory area; and
   resuming the one or more treads for processing on the target system.

4. The computer-implemented method of claim 3, further comprising fixing a first thread out of the one or more threads if the first thread was suspended while executing a portion of the original executable code in the original memory area.

5. The computer-implemented method of claim 3, wherein injecting the modified executable code comprises:
   creating a copy of the original executable code;
   locating the new memory location for the modified executable code;
   writing the modified executable code to the target memory at the new memory location; and
   redirecting execution of the heterogeneous component to the modified executable code.

6. The computer-implemented method of claim 5, wherein redirecting execution includes writing a jump instruction in a first address of the original memory area, the jump instruction including an offset to the new memory location.

7. The computer-implemented method of claim 1, wherein the modified executable code comprises a kernel mode code that executes in kernel mode.

8. The computer-implemented method of claim 7, wherein inserting the modified executable code comprises:
  replacing a first portion of the original executable code that resides in a first part of the original memory area with an instruction that disallows a thread from executing instructions in a second part of the original memory area;
  replacing the second part of the original memory area with a portion of the modified executable code; and
  replacing the instruction in the first part of the original memory area with another portion of the modified executable code, in manner such that the original memory area contains the modified executable code.

9. The computer-implemented method of claim 1, further comprising determining whether the target system is a remote system, and if the target system is a remote system, initiating a dynamic instrumentation process on the target system that enables communication with a tool residing on a local system that is performing the dynamic modifications to the heterogeneous program.

10. The computer-implemented method of claim 1, wherein the platform neutral intermediate representation is derived from the original executable code that resides in the target system memory.

11. The computer-implemented method of claim 1, wherein the platform neutral intermediate representation is derived from the original executable code that resides on a local storage device.

12. The computer-implemented method of claim 1, wherein the modified executable code comprises a procedure.

13. The computer-implemented method of claim 1, wherein the modified executable code comprises a basic block.

14. The computer-implemented method of claim 1, wherein the modified executable code comprises an instruction.

15. A computerized system for modifying a heterogeneous program associated with an online target system without talking the target system offline, the system comprising:
  a processing unit;
  a system memory coupled to the processing unit through a system bus;
  a computer-readable medium coupled to the processing unit through a system bus;
  a platform neutral hierarchical intermediate representation for a heterogeneous program residing in the target system memory, wherein the intermediate representation represents a function of the heterogeneous program;
  a transformation process executing in the processing unit for modifying the platform neutral hierarchical intermediate representation to create a modified intermediate representation associated with the heterogeneous program; and
  a dynamic modification process executing in the processing unit for modifying an executable code in a target system memory based on the modified intermediate representation without taking the target system offline, the executable code being platform dependent and associated with the heterogeneous program.

16. The computerized system of claim 15, wherein modifying the executable code in the target system includes:
  suspending one or more threads from processing on the target system;
  if a modified executable code based on the modified intermediate representation consumes more memory than the executable code, injecting the modified executable code into the target system memory at a new memory location;
  else, patching the modified executable code into the target system memory by overwriting an original memory area with the modified executable code, the original memory are being associated with the executable code; and
  resuming the one or more threads for processing on the target system.

17. The computerized system of claim 16, wherein injecting the modified executable code includes creating a copy of the executable code;
  locating the new memory location for the modified executable code;
  writing the modified executable code to the target memory at the new memory location; and
  redirecting execution of the heterogeneous program to the modified executable code.

18. The computerized system of claim 15, wherein modifying the executable code in the target system includes:
  replacing a first portion of the executable code that resides in a first part of the original memory area with an instruction that disallows a thread from executing instructions in a second part of the original memory area;
  replacing the second part of the original memory area with a portion of the modified executable code; and
  replacing the instruction in the first part of the original memory area with another portion of the modified executable code, in manner such that the original memory area contains the modified executable code.

19. The computer system of claim 15, wherein the target system is a remote system.

20. A computer-readable medium having computer-executable components for modifying an online target system without taking the target system offline, comprising:
  a transformation process configured to modify a platform neutral hierarchical intermediate representation of a heterogeneous program executing in a target system memory; and
  a dynamic modification process configured to modify an executable code in the target system memory based on the modified intermediate representation without taking the target system offline, the executable code being platform dependent and associated with the heterogeneous program.

* * * * *